(12) United States Patent
Goetz et al.

(10) Patent No.: US 9,733,907 B2
(45) Date of Patent: Aug. 15, 2017

(54) SYSTEM AND METHOD FOR TESTING COMPILER IMPLEMENTATION USING DYNAMIC COMBINATORIAL TEST GENERATION

(71) Applicant: Oracle International Corporation, Redwood Shores, CA (US)

(72) Inventors: Brian Goetz, Williston, VT (US); Jonathan Gibbons, Mountain View, CA (US); Maurizio Cimadamore, Dublin (IE)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 82 days.

(21) Appl. No.: 13/677,129

(22) Filed: Nov. 14, 2012

(65) Prior Publication Data
US 2014/0123109 A1    May 1, 2014

Related U.S. Application Data

(60) Provisional application No. 61/720,314, filed on Oct. 30, 2012.

(51) Int. Cl.
*G06F 9/44* (2006.01)
*G06F 9/45* (2006.01)
*G06F 11/36* (2006.01)

(52) U.S. Cl.
CPC ............. *G06F 8/41* (2013.01); *G06F 8/30* (2013.01); *G06F 8/447* (2013.01); *G06F 11/3672* (2013.01)

(58) Field of Classification Search
CPC ............ G06F 11/3688; G06F 11/3664; G06F 11/3684; G06F 11/362; G06F 11/3672
See application file for complete search history.

(56) References Cited

U.S. PATENT DOCUMENTS

| | | | |
|---|---|---|---|
| 4,834,628 | A | 6/1989 | Sasaki |
| 5,404,485 | A | 4/1995 | Ban |
| 5,485,595 | A | 1/1996 | Assar et al. |
| 5,524,230 | A | 6/1996 | Sakaue et al. |

(Continued)

OTHER PUBLICATIONS

Clark, Mike, "Using Blocks in iOS 4: The Basics" retrieved Nov. 15, 2013 <http://pragmaticstudio.com/blog/2010/7/28/ios4-blocks-1>, 6 pages.

(Continued)

*Primary Examiner* — Hang Pan
(74) *Attorney, Agent, or Firm* — Tucker Ellis LLP

(57) ABSTRACT

A system and method can support compiler testing in a programming language environment. The programming language environment can include a testing framework that can provide a program template based on a programming language that is targeted by a compiler implementation to be tested. Furthermore, the testing framework can generate a plurality of sub-tests that contains different variations in the test space based on the program template, and can use the compiler implementation to be tested to compile the generated sub-tests. Finally, the testing framework can check the output of the compiler implementation to be tested against the expected output for the generated sub-tests.

20 Claims, 2 Drawing Sheets

(56) References Cited

U.S. PATENT DOCUMENTS

| | | | |
|---|---|---|---|
| 5,544,356 A | 8/1996 | Robinson et al. | |
| 5,553,261 A | 9/1996 | Hasbun et al. | |
| 5,581,723 A | 12/1996 | Hasbun et al. | |
| 5,611,067 A | 3/1997 | Okamoto et al. | |
| 5,933,847 A | 8/1999 | Ogawa | |
| 5,966,720 A | 10/1999 | Itoh et al. | |
| 6,119,145 A | 9/2000 | Ikeda et al. | |
| 6,604,168 B2 | 8/2003 | Ogawa | |
| 6,735,680 B2 | 5/2004 | Ahmad | |
| 6,925,638 B1 | 8/2005 | Koved et al. | |
| 2003/0018671 A1* | 1/2003 | Bera | 708/200 |
| 2004/0181713 A1* | 9/2004 | Lambert | G06F 11/3688 714/48 |
| 2005/0010898 A1* | 1/2005 | Ogawa et al. | 717/106 |
| 2005/0086022 A1* | 4/2005 | Lindberg et al. | 702/123 |
| 2005/0278374 A1 | 12/2005 | Patrick et al. | |
| 2007/0150806 A1* | 6/2007 | Hartmann | 715/523 |
| 2009/0018811 A1* | 1/2009 | Paradkar | G06F 11/3684 703/22 |
| 2009/0172649 A1* | 7/2009 | Teplitsky et al. | 717/143 |
| 2010/0050159 A1* | 2/2010 | Daniel | G06F 11/3624 717/125 |
| 2010/0122073 A1 | 5/2010 | Narayanaswamy et al. | |
| 2012/0210320 A1 | 8/2012 | Goetz et al. | |

OTHER PUBLICATIONS

Diehl, Stephan, "A Formal Introduction to the Compilation of Java", Software—Practice and Experience, vol. 28(3), 297-327(Mar. 1998).

Gosling, James et al., "The Java™ Language Specification Java SE 7 Edition", Release Jul. 2011, Copyright © 2011 Oracle America, Inc., 650 pages.

\* cited by examiner

SYSTEM AND METHOD FOR TESTING COMPILER IMPLEMENTATION USING DYNAMIC COMBINATORIAL TEST GENERATION

CLAIM OF PRIORITY

This application claims the benefit of priority on U.S. Provisional Patent Application No. 61/720,314, entitled "SYSTEM AND METHOD FOR SUPPORTING A PROGRAMMING LANGUAGE ENVIRONMENT" filed Oct. 30, 2012, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software, and is particularly related to supporting compiler testing in a programming language environment.

BACKGROUND

Programming language can be used to write software source code, or source file, that contains various instructions. The source code, or source file, can be compiled into executables that can run on different types of computers, or computational devices. As the programming language becomes more complex, the risk due to regression and interaction between various programming language features can become more serious. The traditional compiler testing can become inadequate to verify whether the various modifications or enhancements to the programming language compiler work appropriately. For example, existing methodologies for writing compiler tests can be insufficient to provide adequate test coverage. This is because that the test space in compiler implementations can be enormous, and a single test program may only be able to cover a small fraction of the whole test space.

This is the general area that embodiments of the invention are intended to address.

SUMMARY

Described herein are systems and methods that can support compiler testing in a programming language environment. The programming language environment can include a testing framework that can provide a program template based on a programming language that is targeted by a compiler implementation to be tested. Furthermore, the testing framework can generate a plurality of sub-tests that contain different variations in the test space based on the program template, and can use the compiler implementation to be tested to compile the generated sub-tests. Finally, the testing framework can check the output of the compiler implementation to be tested against the expected output for the generated sub-tests.

DETAILED DESCRIPTION

Described herein are systems and methods that can support compiler testing in a programming language environment.

In accordance with an embodiment of the invention, compiler tests can be developed for testing different compiler implementations. The compiler test can be implemented using a programming language accepted by the compiler. The compiler test can verify whether programs that are considered to be valid program by the programming language specification are accepted by the compiler implementation under test. On the other hand, the compiler test can also check whether invalid programs are correctly rejected by the compiler implementation.

There can be two types of tests: positive tests, which use test programs that are expected to be accepted by the compiler, and negative tests, which use test programs that are expected to be rejected by the compiler.

The compiler tests can be developed in hand-written standalone tests. This approach can become inadequate for testing modern compilers, since the compiler feature can span across multiple dimensions in the test space. A simple standalone test may only represent a single point in a large test space. As a result, the percentage of the test space covered by the hand-written standalone tests can be insufficient.

For example, in a programming language such as JAVA, which supports arithmetic operations on different numeric types (e.g. int, long, double, float, short, and byte), the testing of a compiler implementation on whether the simple program "1+1" is accepted may require 36 combinations. In addition, the compiler test may need to take into consideration the type conversions (such as widening an int result to a long result), which may increase the number of combinations required to 216.

Thus, only relying on hand-written standalone tests might be impractical to stress test a compiler implementation. For a simple test, as a trade-off, the test developer may chose to write standalone tests for a few selected cases. On the other hand, the test program may need to handle millions of combinations in the cases of more complicated interactions between various programming language features.

In accordance with an embodiment of the invention, the compiler tests can dynamically generate different sub-tests embodying interesting variations for a given program pattern. For example, a single test program including a few hundred lines can generate and test thousands or millions of useful combinations. Thus, the generated sub-tests can be beneficial in finding errors in the compiler implementation.

Dynamic Combinatorial Test Generation

Figure 1:
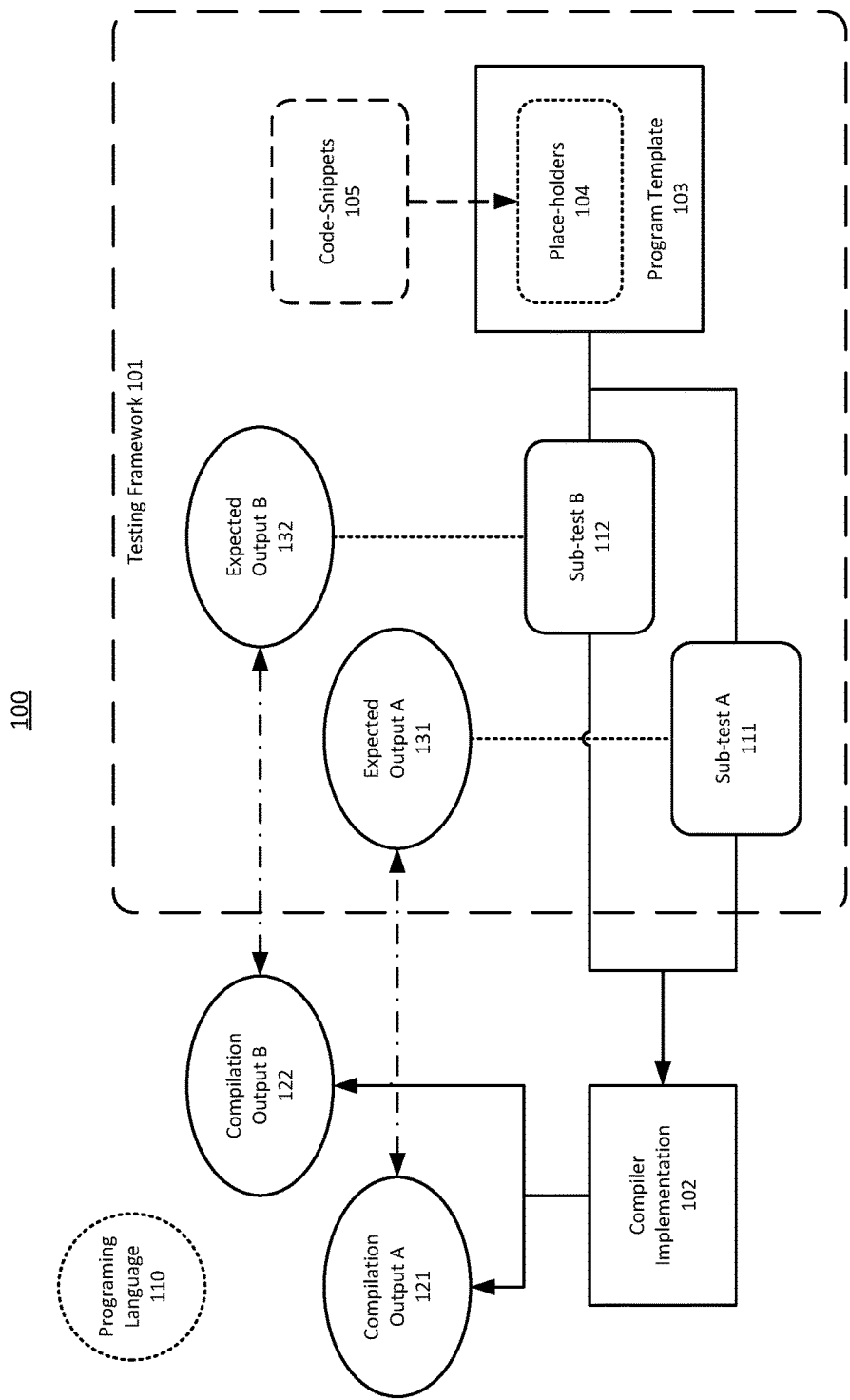
FIG. 1 shows an illustration of supporting dynamic combinatorial test generation in a programming language environment in accordance with various embodiments of the invention.

FIG. 1 shows an illustration of supporting dynamic combinatorial test generation in a programming language environment in accordance with various embodiments of the invention. As shown in FIG. 1, a programming language environment 100 can use a testing framework 101 to test a compiler implementation 102. The compiler implementation 102 can target a programming language 110 in the programming language environment 100.

The testing framework 101 can use a program template 103, which can be based on the programming language 110 that is targeted by the compiler implementation 102. Furthermore, the testing framework 101 can generate a plurality of sub-tests, e.g. sub-test A-B 111-112, that represents different variations based on the program template 103. Then, the compiler implementation 102 can be used to compile the sub-tests A-B 111-112, and produce corresponding compilation outputs A-B 121-122.

Furthermore, the program template 103 can include one or more place-holders 104 that can capture various features specified in the programming language 110. The testing framework 101 can use the different place-holders 104 to inject actual code-snippets 105 into the program template 103 for generating different sub-test A-B 111-112. Here, the code-snippets 105 can be implemented using the programming language 110. Additionally, the generation of the code-snippets 105 can be in a recursive fashion, e.g. some code-snippets 105 can be generated using other templates.

The testing framework 101 allows the different variations in the sub-tests A-B 111-112 to be generated combinatorially based on the program template 103, by varying relevant programming language features, or relevant dimensions of choice in the test space. For example, in an object-oriented programming language such as JAVA, the relevant programming language features can include class or method accessibility (such as public, private, or protected), program structure elements (such as class, interface, abstract class), types of variables (such as int, long, String), and method signature (such as the number of arguments and whether or not a method throws exceptions, etc.)

On the other hand, the testing framework 101 can avoid generating sub-tests for loose-coupled, or irrelevant, programming language features, e.g. the combination of an addition operation with a printing feature.

In accordance with various embodiments of the invention, the number of the generated sub-tests represents the number of variations in the test space based on the program template 103. It can be beneficial to use the dynamic combinatorial test generation approach to generate a large number of sub-tests. Also, the testing framework 101 can discard one or more generated sub-tests, which are considered less important, when the total number of generated sub-tests exceeds a maximum number.

Additionally, the testing framework 101 can compute an expected output for each generated sub-test A-B 111-112. Then, the testing framework 101 can compare the actual output of the compiler implementation, e.g. compilation output A-B 121-122, against the expected output for each sub-test, e.g. expected output A-B 131-132. Furthermore, the strength of a compiler test may depend on how precise the expected output is.

For example, the testing framework 101 can generate various sub-tests for testing whether a compiler implementation can handle the arithmetic operations on different numeric types correctly. One sub-test can include the source code that adds an integer, e.g. "1", to a String, e.g. "banana." The compiler implementation is expected to produce an error message indicating that the operation is inappropriate. A weak test can simply verify that the compilation fails, while a stronger test can verify that the compiler implementation 102 can provide a correct error message.

On the other hand, another sub-test can be generated to include the source code that adds an integer, e.g. "1", to a float, e.g. "1.0". In this case, the compiler implementation is expected to perform a type conversion and create executables that can be run on a computer and can produce a result of a float, e.g. "2.0".

An Exemplary Testing Framework

In accordance with various embodiments of the invention, a combo-test can be developed based on a testing framework. Attached is Appendix A that provides information regarding an exemplary testing framework. The information in Appendix A is provided for illustration purposes and should not be construed to limit all of the embodiments of the invention.

In Appendix A, a combo-test, i.e. an instance of the LambdaConversionTest Class, can be used to test a JAVA compiler implementation. The LambdaConversionTest can extend from a ComboTestBase base class, or interface (Line 1). The LambdaConversionTest can define seven dimension variables using JAVA annotations, e.g. @DimensionVar. Furthermore, each sub-test generated by the LambdaConversionTest can include three JAVA source files, as defined using JAVA annotations, e.g. @SourceFile.

The LambdaConversionTest can include a set of source templates written in JAVA with each source template associated with a different source file. The source templates can contain one or more place-holders, each of which can be used to inject custom code-snippets into the source template. A sub-test, which can be considered as an equivalent of a single standalone test, is created when the LambdaConversionTest finishes replacing the place-holders in the set of source templates with the actual code-snippets.

The source template can be defined in the format of either a string or a file. For example, the source template for creating a JAVA source file, Sam.java, includes a string of samSource, which is defined as "#{PACKAGE.PACKAGE_DECL}\n#{CLASS}". The LambdaConversionTest can use the string of samSource to generate different Sam.java JAVA source files in different sub-tests, by injecting different code-snippets that defines the values of PackageKind and SamKind in samSource. The different placeholders in the string of samSource can be used to vary different dimension variables in the test space, e.g. PACKAGE and CLASS. Thus, the LambdaConversionTest can produce different variations for the same test pattern.

Furthermore, each relevant dimensional variable can be associated with a particular range of variations or alternatives. A testing framework can iterate over the relevant dimensional variables in the test space as shown in the following.

```
public static void main(String[ ] args) throws Exception {
    for (PackageKind samPkg : PackageKind.values( )) {
        for (ModifierKind modKind : ModifierKind.values( )) {
            for (SamKind samKind : SamKind.values( )) {
                for (MethodKind meth : MethodKind.values( )) {
                    for (TypeKind retType : TypeKind.values( )) {
                        for (TypeKind argType : TypeKind.values( )) {
                            for (TypeKind thrownType : TypeKind.values( )) {
                                new LambdaConversionTest(samPkg, modKind,
                                samKind,
                                    meth, retType, argType, thrownType).test( );
                            }
                        }
                    }
                }
            }
        }
    }
}
```

Additionally, the combo-test can compute the expected output for each generated sub-test, which can be expressed as a function of the dimensions of the test-space covered by the test. The process can be repeated by generating all the relevant combinations of the dimension variables, replacing the source template place-holders with different snippets, thus achieving slightly different sub-tests/expected output pairs for each generated sub-test.

Once the sub-tests/expected output pairs have been generated, each generated sub-test can be compiled and executed separately, and the output from the compiler implementation can be checked against the expected output associated with each sub-test. For example, the LambdaConversionTest includes a postCompile method (Lines 25-40) that not only can verify whether a compilation is succeed or failed as expected, but also can verify whether the compilation has failed for a right reason.

Thus, the testing framework can verify the handling of subtle interactions between relevant programming language features in a compiler implementation, and can provide a high level of confidence that a feature in a compiler implementation has been implemented completely and correctly.

Figure 2:
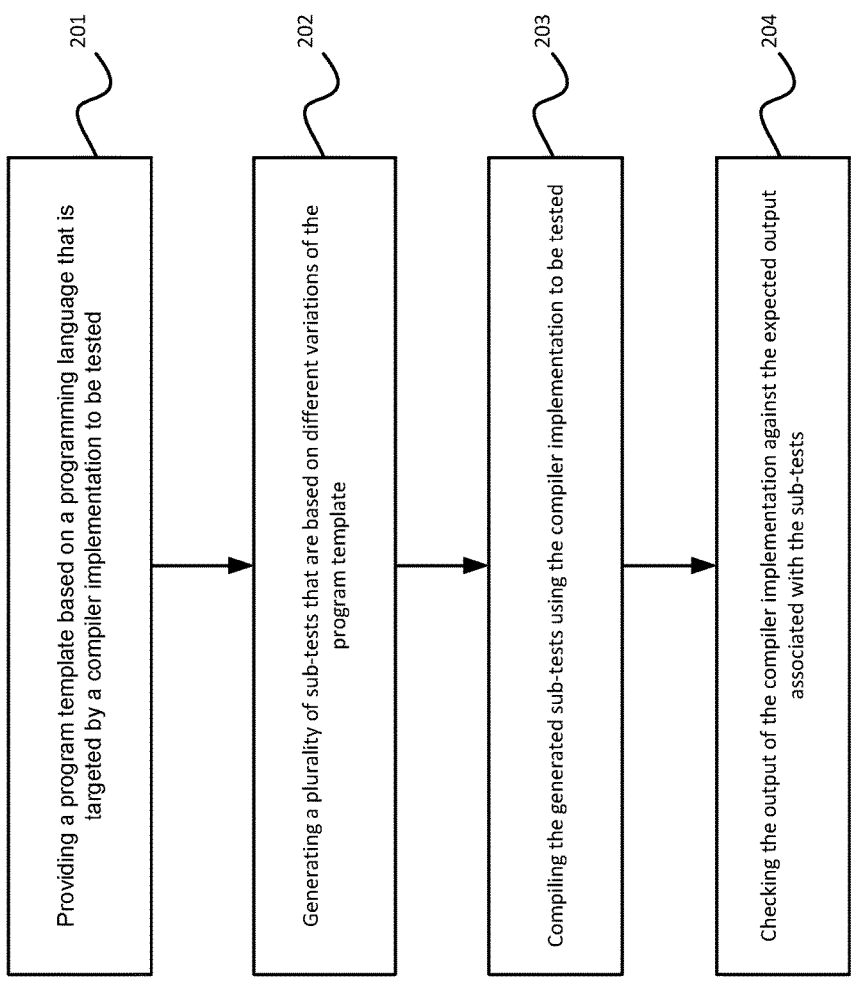
FIG. 2 illustrates an exemplary flow chart for supporting dynamic combinatorial test generation in a programming language environment in accordance with an embodiment of the invention.

FIG. 2 illustrates an exemplary flow chart for supporting dynamic combinatorial test generation in a programming language environment in accordance with an embodiment of the invention. As shown in FIG. 2, at step 201, a testing framework can provide a program template based on a programming language that is targeted by a compiler implementation to be tested. Then, at step 202, the testing framework can generate a plurality of sub-tests that are based on different variations of the program template. Furthermore, at step 203, the testing framework can compile the generated sub-tests using the compiler implementation to be tested. Finally, at step 204, the testing framework can check the output of the compiler implementation against the expected output associated with the sub-tests.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

APPENDIX A

The following provides information regarding an exemplary testing framework. The information is provided for illustration purposes and should not be construed to limit all of the embodiments of the invention.

An example of a combo-test

```
1   public class LambdaConversionTest extends
        ComboTestBase<LambdaConversionTest> {
2
3       @Factory
4       public static Object[ ] testCombo( ) throws Exception {
5           return factory(LambdaConversionTest.class);
6       }
7
8       @DimensionVar("PACKAGE") PackageKind samPkg;
9       @DimensionVar("MODIFIER") ModifierKind modKind;
10      @DimensionVar("CLASS") SamKind samKind;
11      @DimensionVar("METH") MethodKind meth;
12      @DimensionVar("RET") TypeKind retType;
13      @DimensionVar("ARG") TypeKind argType;
14      @DimensionVar("THROWN") TypeKind thrownType;
15
16      @SourceFile("Sam.java")
17      String samSource = "#{PACKAGE.PACKAGE_DECL} \n
            #{CLASS}";
18
19      @SourceFile("PackageClass.java")
20      String packageSource = "#{PACKAGE.PACKAGE_DECL}\n
            #{MODIFIER} class PackageClass extends Exception { }";
21
22      @SourceFile("Client.java")
23      String clientSource =
            "#{PACKAGE.IMPORT_STATEMENT}\n
            class Client { Sam s = x -> null; }";
24
25      @Override
26      protected void postCompile(String group) {
27          if (samKind != SamKind.INTERFACE) {
28              assertCompileFailed("SAM type must be an interface");
29          } else if (meth != MethodKind.NON_GENERIC) {
30              assertCompileFailed("target method must be non-generic");
31          } else if (samPkg != PackageKind.NO_PKG &&
32                  modKind != ModifierKind.PUBLIC &&
33                  (retType == TypeKind.PKG_CLASS
34                  || argType == TypeKind.PKG_CLASS
35                  || thrownType ==
                        TypeKind.PKG_CLASS)) {
36              assertCompileFailed("target must not contain
                    inaccessible types");
37          } else {
38              assertCompileSucceeded( );
39          }
40      }
41
42      static enum PackageKind implements Template {
43          NO_PKG(""),
44          PKG_A("a");
45
46          String pkg;
47
48          PackageKind(String pkg) {
49              this.pkg = pkg;
50          }
51
52          public String expand(String selector) {
53              if (this == NO_PKG)
54                  return "";
55              switch (selector) {
56                  case "PACKAGE_DECL": return
                        String.format("package %s;", pkg);
57                  case "IMPORT_STATEMENT": return
                        String.format("import %s.*;", pkg);
```

-continued

An example of a combo-test

```
58              default: throw new IllegalArgumentException(selector);
59           }
60         }
61      }
62
63      static enum SamKind implements Template {
64         CLASS("public class Sam { }"),
65         ABSTRACT_CLASS("public abstract class Sam { }"),
66         ANNOTATION("public @interface Sam { }"),
67         ENUM("public enum Sam { }"),
68         INTERFACE("public interface Sam { \n #{METH}; \n }");
69
70         String template;
71
72         SamKind(String template) { this.template = template; }
73
74         public String expand(String selector) { return template; }
75      }
76
77      static enum ModifierKind implements Template {
78         PUBLIC("public"),
79         PACKAGE("");
80
81         String template;
82
83         ModifierKind(String template) { this.template = template; }
84
85         public String expand(String selector) { return template; }
86      }
87
88      static enum TypeKind implements Template {
89         EXCEPTION("Exception"),
90         PKG_CLASS("PackageClass");
91
92         String template;
93
94         private TypeKind(String template) { this.template =
              template; }
95
96         public String expand(String selector) { return template; }
97      }
98
99      static enum MethodKind implements Template {
100        NONE(""),
101        NON_GENERIC("public #{RET} m(#{ARG} s) throws
              #{THROWN};"),
102        GENERIC("public <X> #{RET} m(#{ARG} s) throws
              #{THROWN};");
103
104        String template;
105
106        private MethodKind(String template) { this.template =
              template; }
107
108        public String expand(String selector) { return template; }
109     }
110
111  }
112
```

What is claimed is:

1. A method for supporting compiler testing in a programming language environment, the method comprising:
providing a program template based on a programming language that is targeted by a compiler implementation to be tested, wherein the program template defines a plurality of dimension variables that specify a plurality of features of the programming language, including package structure of a class, class or method accessibility, method signature, exception handling, and program structure, wherein each of the plurality dimension variables specifies one of the plurality of features of the programming language, and defining, in the program template, a plurality of source code templates, each source code template including one or more placeholders and provided for use in creating a source code file;
generating a plurality of sub-tests, each sub-test comprising a plurality of source code files that are generated by replacing the one or more placeholders in each source code template with code snippets generated by combinatorially varying each of the plurality of dimension variables;
compiling the plurality of sub-tests using the compiler implementation to be tested, wherein said compiling comprises generating a compilation output for each sub-test of said plurality of sub-tests by operating the compiler implementation to be tested to compile the plurality of source code files in said each subtest into executable code;
computing, for each sub-test of the plurality of sub-tests, an expected compilation output for said each sub-test; and
for each sub-test of the plurality of sub-tests, comparing the compilation output produced by the compiler implementation for that sub-test against the expected compilation output for said each sub-test.

2. The method according to claim 1, wherein at least one code-snippet is generated by another template.

3. The method according to claim 1, further comprising:
discarding one or more generated sub-tests when the generated sub-tests exceed a maximum number.

4. The method according to claim 1, wherein the plurality of dimension variables defined in the program template are defined using annotations.

5. The method of claim 1, wherein the compiler implementation to be tested is a compiler implementation of an object-oriented programming language.

6. The method of claim 1, wherein an actual logic that performs replacing the one or more placeholders in each source code template with code snippets generated by combinatorially varying each of the plurality of dimension variables is part of the program template.

7. The method of claim 1, wherein the plurality of features of the programming language further include types of variables, and program structures.

8. A system for supporting compiler testing in a programming language environment, comprising:
one or more microprocessors;
a program template based on a programming language that is targeted by a compiler implementation to be tested, wherein the program template defines
a plurality of dimension variables that specify a plurality of features of the programming language, including package structure of a class, class or method accessibility, method signature, exception handling, and program structure, wherein each of the plurality of dimension variables specifies one of the plurality of features of the programming language, and
a plurality of source code templates, each source code template including one or more placeholders and provided for use in creating a source code file; and
a testing framework, executing on the one or more microprocessors, that operates to perform the steps of
generating a plurality of sub-tests, each sub-test comprising a plurality of source code files that are generated by replacing the one or more placeholders in each source code template with code snippets generated by combinatorially varying each of the plurality of dimension variables, compiling the generated sub-tests using the compiler implementation to be tested, wherein said compiling comprises generating a compilation output for each sub-test of said plurality of sub-tests by operating the compiler implementation to be tested to compile the plurality source code files in said each subtest into executable code;

computing, for each sub-test of the plurality of sub-tests, an expected compilation output for said each sub-test, comparing the compilation output produced by the compiler implementation to be tested for each sub-test of the plurality of subtests against the expected compilation output for said each sub-test.

9. The system according to claim 8, wherein at least one code-snippet is generated by another template.

10. The system according to claim 8, wherein the testing framework operates to discard one or more generated sub-tests when the generated sub-tests exceed a maximum number.

11. The system according to claim 8, wherein the plurality of dimension variables defined in the program template are defined using annotations.

12. The system of claim 8, wherein the compiler implementation to be tested is a compiler implementation of an object-oriented programming language.

13. The system of claim 8, wherein an actual logic that performs replacing the one or more placeholders in each source code template with code snippets generated by combinatorially varying each of the plurality of dimension variables is part of the program template.

14. The system of claim 8, wherein the plurality of features of the programming language further include types of variables, and program structures.

15. A non-transitory machine readable storage medium having instructions stored thereon for supporting compiler testing, which instructions, when executed cause a system to perform steps comprising:

providing a program template based on a programming language that is targeted by a compiler implementation to be tested, wherein the program template defines a plurality of dimension variables, wherein the plurality of dimension variables specify a plurality of features of the programming language, including package structure of a class, class or method accessibility, method signature, exception handling, and program structure, wherein each of the plurality of dimension variables specifies one of the plurality of features of the programming language, and defining, in the program template, a plurality of source code templates, each source code template including one or more placeholders and provided for use in creating a source code file;

generating a plurality of sub-tests, each sub-test comprising a plurality of source code files that are generated by replacing the one or more placeholders in each source code template with code snippets generated by combinatorially varying each of the plurality of dimension variables;

compiling the plurality of sub-tests using the compiler implementation to be tested, wherein said compiling comprises generating a compilation output for each sub-test of said plurality of sub-tests by operating the compiler implementation to be tested to compile the plurality of source code files in said each subtest into executable code;

computing, for each sub-test of the plurality of sub-tests, an expected compilation output for said each sub-test; and for each sub-test of the plurality of sub-tests, comparing the compilation output produced by the compiler implementation to be tested for that sub-test against the expected compilation output for said each sub-test.

16. The non-transitory machine readable storage medium according to claim 15, wherein at least one code-snippet is generated by another template.

17. The non-transitory machine readable storage medium according to claim 15, further comprising:

discarding one or more generated sub-tests when the generated sub-tests exceed a maximum number.

18. The non-transitory machine readable storage medium according to claim 15, wherein the plurality of dimension variables defined in the program template are defined using annotations.

19. The non-transitory machine readable storage medium according to claim 15, wherein the compiler implementation to be tested is a compiler implementation of an object-oriented programming language.

20. The non-transitory machine readable storage medium according to claim 15, wherein an actual logic that performs replacing the one or more placeholders in each source code template with code snippets generated by combinatorially varying each of the plurality of dimension variables is part of the program template.

* * * * *